March 22, 1960 F. E. SCHULTZ 2,929,208
PROPELLANT INJECTION HEAD FOR JET PROPULSION SYSTEM
Filed Oct. 2, 1950
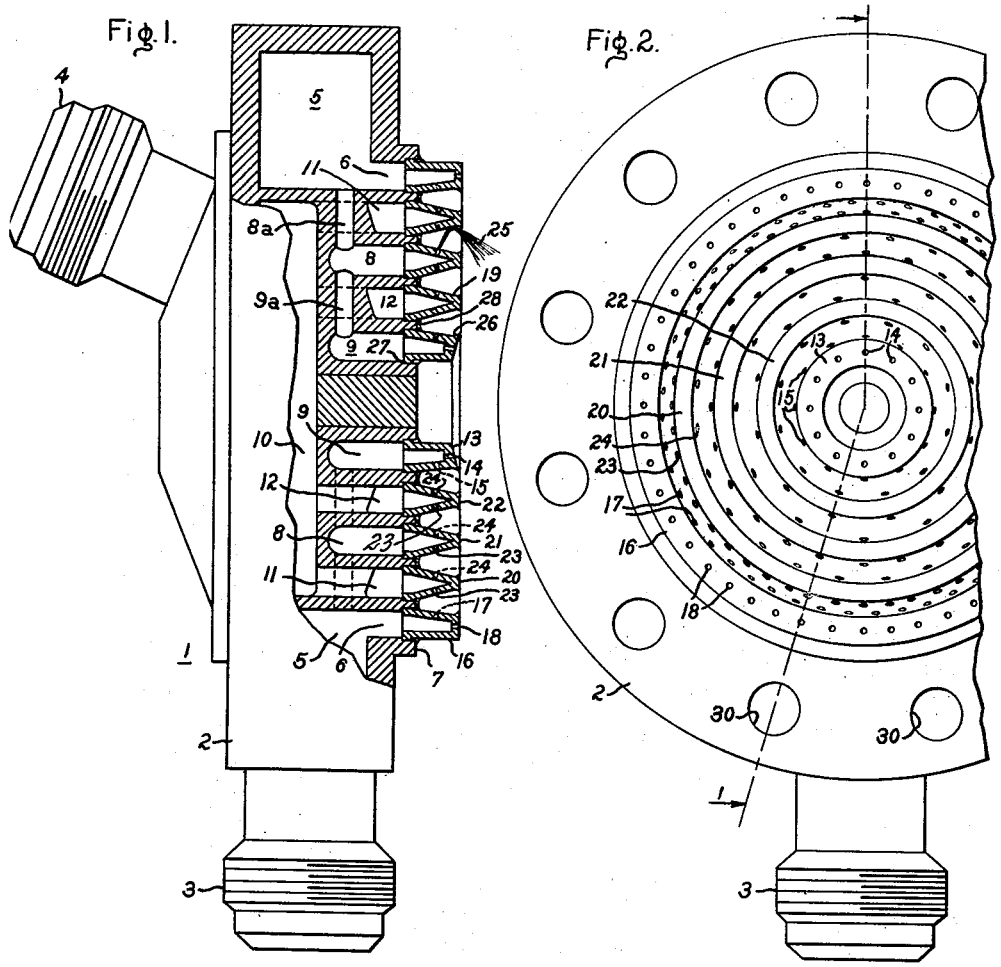
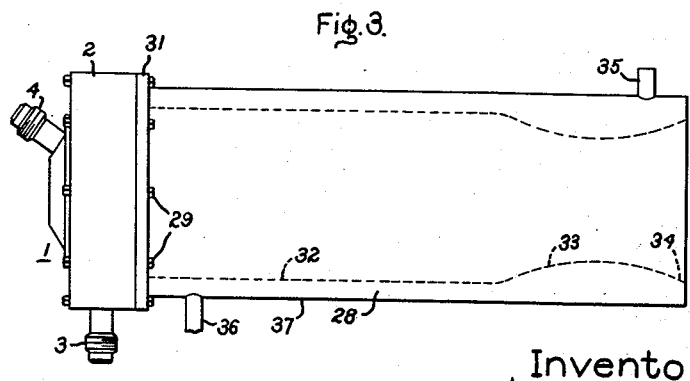
Inventor:
Frederick E. Schultz,
by *Frank H. Mold*
His Attorney.

United States Patent Office 2,929,208
Patented Mar. 22, 1960

2,929,208

PROPELLANT INJECTION HEAD FOR JET PROPULSION SYSTEM

Frederick E. Schultz, Schenectady, N.Y., assignor to General Electric Company, a corporation of New York Application October 2, 1950, Serial No. 187,954

4 Claims. (Cl. 60—39.74)

This invention relates to an injection head for fluid reactants. More particularly, it relates to a new and improved reactant injection head for jet propulsion motors.

The term "jet propulsion engine" as used herein includes all so-called reaction type motors wherein the mechanical driving thrust or force is derived from the reaction of equal and opposite forces arising between the motor body and the body of reactants attained during the conversion of the reactants into gaseous products of greater volume than that occupied by the reactants as distinguished from internal combustion engines of the reciprocating type. Devices falling within this definition and in the operation of which this invention may be employed are commonly known as rocket motors, turbojets, pulse-jets, and turbo-prop-jets. While the present injection head is, for exemplary purposes described herein as being employed in a rocket motor, it will, of course, be realized that it may be used in any jet propulsion system.

It is recognized that one of the most efficient methods of atomizing liquid streams is to cause them to impinge with substantial force upon a surface. Preferably, in order to attain the greatest degree of breaking-up of the stream, the angle between the stream and the splash surface approaches ninety degrees. By the use of a splash surface relatively complicated spray nozzles are obviated, the stream of fluid to be atomized being simply ejected from a hole onto the surface where atomization takes place. Despite the obvious advantage in using splash plates, they have been incapable of practical use in general in jet propulsion engines for the reason that it has been impossible to properly cool the splash surface due to the high temperatures occurring in such devices which burn and melt such surfaces even when placed relatively close to the issuing stream of liquid.

It is an object of this invention to provide a new and improved injection head for jet propulsion motors.

Another object of the present invention is to provide such an injection head embodying splash surfaces which are not subject to burning or melting.

Other objects will become apparent and the invention better understood from a consideration of the following description and the drawing in which Fig. 1 is an elevational view of the present injection head partly in cross-section; Fig. 2 is a partial top plan view of the injection head; and Fig. 3 is a side elevational view of a jet propulsion motor employing the injection head.

It has been found that an injection head for fluid fuels embodying the splash plate principle of atomization may be provided in which the splash surfaces are durable and resistant to melting and burning.

More particularly, it has been found that such an injection head may be provided by utilizing the fluid injected by the head as a cooling medium.

Specifically, it has been found that such an improved injection head may be provided by a plurality of concentrically arranged hollow rings having liquid exit holes impinging on the adjacent ring which acts as a splash surface, the rings being cooled by the reactant within the rings.

For a more complete understanding of the present invention reference is made to the drawing. Shown in Fig. 1 is injection head 1 having body 2 and reactant inlet conduits 3 and 4. Conduit 3 leads into annular chamber 5 and thence directly into annular hole 6 through the face 7 of the head. Conduit 3 is also connected to annular holes 8 and 9 through passages 8a and 9a respectively. Conduit 4 leads into a header or chamber 10 and thence into annularly disposed holes 11 and 12. Holes 6, 8, 9, 11, and 12 are shown as being of the same size though, of course, they may be of different sizes if desired.

The actual injection of fluid from the head takes place through holes in raised or projecting hollow rings which are seated in the annular feed holes 6, 8, 9, 11, and 12. The hollow rings are preferably of varied design depending on their location. Thus inner ring 13 may be shaped as shown with fluid emission holes 14 at the top and spaced as desired and emission holes 15 at the outer side which are so directed as to impinge on the surface of the adjacent ring. Holes may also be provided in ring 13 which are directed more or less radially inward. The outermost ring 16 is somewhat similar to ring 13. However, holes 17 in the side of this ring are directed radially inward toward the adjacent ring and holes 18 are also provided in the top of the ring. Preferably, the reactant fed through the outer ring is the fuel reactant rather than the oxidizer. In this way the issuing oxidizer is completely surrounded by the fuel and there is less danger of unmixed oxidizer reaching the combustion chamber walls to cause hot spots and burn-outs. All intermediate rings, such as 20, 21, and 22, are conveniently constructed alike, the cross-section being narrower at the top than at the bottom with the adjacent sides of neighboring rings sloping away from one another. These rings have side holes 23 and 24 canted slightly outward and impinging upon the adjacent ring. The holes in the rings are so spaced or staggered that the streams from adjacent rings do not collide directly but rather impinge on the sloping side of the adjacent ring at some point such as 19 for full atomization and change of direction as shown at 25. To insure that the fluid stream is atomized to the highest possible degree and not merely deflected without atomization the surfaces impinged on are preferably reversed somewhat in direction as shown at 26 to provide a more directly opposed striking surface for the liquid stream. This reversal in direction facilitates the rapid intermingling of oxidizer and fuel streams from adjacent rings and is conducive to complete combustion.

The feed rings may be fixed in place in relation to their respective feed holes in any desired manner. One method is that shown in which the rings are seated on shoulders 27 formed in the holes and welded or brazed as at 28 to the body 2 of the head. Others will occur to those skilled in the art.

The reactants or propellants which may be used in connection with the present injection head include as oxidizers liquid oxygen, hydrogen peroxide, nitric acid, etc. Typical fuel reactants which may be used are alcohol, gasoline, kerosene, and other hydrocarbons and organic and metallo-organic materials.

In operation, as pointed out above, the fuel reactant is preferably injected through the outer ring as well as alternate inner rings. Hence, the fuel reactant is introduced through conduit 3 and into annular feed holes 6, 8, and 9. The fuel then enters the corresponding hollow ring proper and is ejected through the holes therein. Likewise, oxidizer reactant is fed through conduit 4, header chamber 10, annular feed holes 11 and 12, and into rings 20 and 21 for ejection through holes such as 23 and 24. It will be noted that the annular feed holes, as well as the interiors of the hollow rings, are relatively large with respect to the final ejection holes. The overall pressure drop in the system is thus largely concentrated in the short and small passages such as 23 and 24 and is easily controlled to meet desired conditions. Good atomization is obtained with low pressure drops.

Since the side holes in adjacent rings are staggered, the jets from the side holes in any one ring proceed substantially unhindered to the splash surface of the adjacent ring and are atomized. The atomized particles mix intimately with the atomized particles from the adjacent ring to form a combustible mixture.

The present invention is particularly characterized by the fact that there is available within the hollow feed rings a relatively large quantity of reactant which acts as a coolant for the walls of the rings and prevents them from becoming burned out or melted. There is thus afforded a means of taking advantage of splash plate atomization without excessive heating.

As pointed out above, the angle of the holes in the feed rings may be varied and the angle of the splash surface altered to change the degree of atomization and the predominant direction of the atomized particles. Also, the number of rings may be increased as the size of the head is increased.

In Fig. 3 is shown a rocket motor as typical of jet propulsion motors in which the present invention may be employed. Injection head 1 is fixed to rocket combustion chamber 28 by means of bolts 29 fitted through holes 30 in the head and in the flange 31 of the motor. The rocket motor is shown conventionally as having an inner combustion wall 32 cylindrical in its upstream portion and restricted downstream to form a throat 33 and nozzle 34 for the exit of hot combustion gases. Inlet conduit 35 and outlet conduit 36 are provided for the flow of coolant between liner or wall 32 and the outer wall 37 of the motor. A rocket motor is chosen as typical of jet propulsion devices merely for purposes of illustration and not in any limiting sense, the present injector being useful in any type of reaction motor using fluid reactants.

By this invention there is provided a new and improved injection head for jet propulsion motors which promotes good atomization, reactant mixing, and burning efficiency.

What I claim as new and desire to secure by Letters Patent of the United States is:

1. An injection head for jet propulsion motors comprising inlet and outlet means for fluids, said outlet means comprising a plurality of projecting, adjacent concentric hollow rings, said rings having sloping sides and holes in the sides thereof which are directed upon the near side of the adjacent ring whereby fluids passing through said holes strike said sides and are atomized.

2. A reactant injection head for jet propulsion systems comprising inlet and outlet means, said outlet means comprising a plurality of projecting, adjacent concentric hollow rings, the adjacent sides of successive rings sloping away from the sides of adjacent rings, the concentrically positioned rings having holes therein which are directed upon the near sides of adjacent rings.

3. A propellant injection head for jet propulsion systems comprising outlet means for propellants comprising a plurality of projecting, adjacent concentric hollow rings, the concentrically positioned rings having holes in the sides thereof directed upon the sides of adjacent rings, the holes in facing sides of adjacent rings being staggered so that streams of propellant from such holes impinge upon solid portions of the adjacent rings.

4. A reactant injection head for jet propulsion systems comprising inlet and outlet means, said outlet means comprising a plurality of projecting, adjacent concentric hollow rings, the outermost ring having outlet holes in the top and inner side thereof, the innermost ring having holes in the top and outer side thereof, and intermediate rings having holes in both sides thereof, the side holes in all rings being directed upon the near sides of adjacent rings.

References Cited in the file of this patent
UNITED STATES PATENTS

| | | |
|---|---|---|
| 2,167,183 | Naab et al. | July 25, 1939 |
| 2,217,649 | Goddard | Oct. 8, 1940 |
| 2,394,629 | Milos | Feb. 12, 1946 |
| 2,405,465 | Summerfield | Aug. 6, 1946 |
| 2,532,709 | Goddard | Dec. 5, 1950 |
| 2,576,678 | Goddard | Nov. 27, 1951 |